United States Patent
Liao et al.

(10) Patent No.: US 12,552,143 B2
(45) Date of Patent: Feb. 17, 2026

(54) POLYOLEFIN ADHESIVE FILM

(71) Applicant: NAN YA PLASTICS CORPORATION, Taipei (TW)

(72) Inventors: Te-Chao Liao, Taipei (TW); Ching-Yao Yuan, Taipei (TW); Chih-Feng Wang, Taipei (TW); Teng-Ko Ma, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 149 days.

(21) Appl. No.: 18/595,337

(22) Filed: Mar. 4, 2024

(65) Prior Publication Data

US 2025/0206008 A1 Jun. 26, 2025

(30) Foreign Application Priority Data

Dec. 22, 2023 (TW) ................................. 112150209

(51) Int. Cl.

| | | |
|---|---|---|
| B32B 27/32 | (2006.01) | |
| B32B 7/12 | (2006.01) | |
| B32B 15/085 | (2006.01) | |
| B32B 15/20 | (2006.01) | |
| B32B 27/08 | (2006.01) | |
| B32B 27/20 | (2006.01) | |
| C08J 5/18 | (2006.01) | |
| C08K 3/36 | (2006.01) | |
| C08K 5/5435 | (2006.01) | |
| C08K 9/06 | (2006.01) | |
| C08L 53/00 | (2006.01) | |
| C09J 7/24 | (2018.01) | |
| C09J 7/38 | (2018.01) | |

(52) U.S. Cl.
CPC ............... *B32B 27/32* (2013.01); *B32B 7/12* (2013.01); *B32B 15/085* (2013.01); *B32B 15/20* (2013.01); *B32B 27/08* (2013.01); *B32B 27/20* (2013.01); *C08J 5/18* (2013.01); *C08K 3/36* (2013.01); *C08K 5/5435* (2013.01); *C08K 9/06* (2013.01); *C08L 53/005* (2013.01); *C09J 7/243* (2018.01); *C09J 7/381* (2018.01); *B32B 2250/04* (2013.01); *B32B 2264/1021* (2020.08); *B32B 2264/303* (2020.08); *B32B 2270/00* (2013.01); *B32B 2307/31* (2013.01); *B32B 2307/414* (2013.01); *B32B 2307/748* (2013.01); *B32B 2457/10* (2013.01); *C08J 2353/00* (2013.01); *C08J 2423/08* (2013.01); *C08J 2423/30* (2013.01); *C09J 2400/10* (2013.01); *C09J 2400/20* (2013.01); *C09J 2423/106* (2013.01)

(58) Field of Classification Search
None
See application file for complete search history.

(56) References Cited

U.S. PATENT DOCUMENTS

2013/0209868 A1* 8/2013 Suzuta .................... B32B 27/32
429/176

FOREIGN PATENT DOCUMENTS

| | | |
|---|---|---|
| CN | 112265331 A | 1/2021 |
| JP | 59172571 A | 9/1984 |
| JP | 2290 A | 1/1990 |
| JP | 881599 A | 3/1996 |
| JP | 2006307104 A | 11/2006 |
| JP | 2007262337 A | 10/2007 |
| JP | 2019-085480 A * | 6/2019 |
| TW | 201349527 A | 12/2013 |
| TW | I819922 B | 10/2023 |
| WO | WO2021145241 A1 | 7/2021 |

OTHER PUBLICATIONS

Machine translation of JP 2019-085480 A (Year: 2019).*

* cited by examiner

*Primary Examiner* — Sheeba Ahmed
(74) *Attorney, Agent, or Firm* — Li & Cai Intellectual Property Office

(57) ABSTRACT

A polyolefin adhesive film includes a support base layer and a bonding adhesive layer formed on the support base layer. The support base layer is a polypropylene film. The bonding adhesive layer includes: a polyolefin copolymer and inorganic particles dispersed in the polyolefin copolymer. The polyolefin copolymer is modified by maleic anhydride, and the inorganic particles are modified by epoxy siloxane. A graft ratio of the maleic anhydride modified on the polyolefin copolymer ranges from 1% to 5%. A weight ratio of the epoxy siloxane modified on the inorganic particles ranges from 0.3% to 4%. When the polyolefin adhesive film undergoes a heating operation, the epoxy siloxane modified on the inorganic particles and the maleic anhydride modified on the polyolefin copolymer undergo a cross-linking reaction, so that a hardness of the bonding adhesive layer is increased.

10 Claims, 3 Drawing Sheets

POLYOLEFIN ADHESIVE FILM

CROSS-REFERENCE TO RELATED PATENT APPLICATION

This application claims the benefit of priority to Taiwan Patent Application No. 112150209, filed on Dec. 22, 2023. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an adhesive film, and more particularly to a polyolefin adhesive film.

BACKGROUND OF THE DISCLOSURE

As shown in FIG. 6, a conventional aluminum-plastic film packaging material usually adopts a dry composite lamination film composed of a polyolefin film PL and an aluminum foil AF. The polyolefin film PL and the aluminum foil AF are bonded together by a glue layer GL (e.g., a polyester glue or a polyurethane glue).

However, during a lamination process, the conventional aluminum-plastic film packaging material is prone to volatilization of volatile organic solvents (VOCs). In addition, a bonding strength between the polyolefin film PL and the aluminum foil AF declines after the conventional aluminum-plastic film packaging material is exposed to high temperature and high humidity for an extended period of time, thereby resulting in an insufficient bonding strength. Furthermore, in the application of power batteries with high output wattage in electric vehicles, the conventional aluminum-plastic film packaging material is prone to delamination or expansion under a high operating temperature, thus causing leakage of electrolytic liquid.

SUMMARY OF THE DISCLOSURE

In response to the above-referenced technical inadequacies, the present disclosure provides a polyolefin adhesive film.

In order to solve the above-mentioned problems, one of the technical aspects adopted by the present disclosure is to provide a polyolefin adhesive film that includes a support base layer and a bonding adhesive layer. The support base layer is a polypropylene film. The bonding adhesive layer is formed on a side surface of the support base layer by co-extrusion. The bonding adhesive layer includes a polyolefin copolymer and inorganic particles dispersed in the polyolefin copolymer. The polyolefin copolymer is modified by maleic anhydride, and the inorganic particles are modified by epoxy siloxane. A graft ratio of the maleic anhydride modified on the polyolefin copolymer ranges from 1% to 5%, and a weight ratio of the epoxy siloxane modified on the inorganic particles ranges from 0.3% to 4%. When the polyolefin adhesive film undergoes a heating operation, the epoxy siloxane modified on the inorganic particles and the maleic anhydride modified on the polyolefin copolymer undergo a cross-linking reaction, so that a hardness of the bonding adhesive layer is increased.

In one of the possible or preferred embodiments, based on a total weight of the bonding adhesive layer being 100 wt %, a content of the polyolefin copolymer modified by the maleic anhydride is not less than 90 wt %, and a content of the inorganic particles modified by the epoxy siloxane ranges from 500 ppm to 2,000 ppm.

In one of the possible or preferred embodiments, in the bonding adhesive layer, an average particle size of the inorganic particles ranges from 1 micrometer to 8 micrometers, and a sphericity of each of the inorganic particles ranges from 0.7 to 1.0. The inorganic particles are selected from the group consisting of silicon dioxide particles, calcium carbonate particles, barium sulfate particles, kaolin clay particles, and mica particles.

In one of the possible or preferred embodiments, in the bonding adhesive layer, the average particle size of the inorganic particles ranges from 3 micrometers to 6 micrometers, and the sphericity of each of the inorganic particles ranges from 0.8 to 1.0.

In one of the possible or preferred embodiments, in the bonding adhesive layer, the polyolefin copolymer is formed by copolymerization of at least two kinds of C2 to C4 olefin molecules, and a melt flow index of the polyolefin copolymer ranges from 3 g/10 min to 5 g/10 min.

In one of the possible or preferred embodiments, the graft ratio of the maleic anhydride modified on the polyolefin copolymer ranges from 2% to 4%, and the weight ratio of the epoxy siloxane modified on the inorganic particles ranges from 0.5% to 2%.

In one of the possible or preferred embodiments, the support base layer is a cast polypropylene film, and a material composition of the cast polypropylene film includes: a propylene block polymer, a vinyl elastomer, and another polyolefin copolymer.

In one of the possible or preferred embodiments, in the support base layer, the propylene block polymer includes blocks composed of ethylene propylene elastic rubber, and a weight percentage of the ethylene propylene elastic rubber in the propylene block polymer is at least 18%. In addition, the vinyl elastomer is an ethylene-butylene elastomer, and a weight percentage of ethylene in the vinyl elastomer is at least 30%.

In one of the possible or preferred embodiments, the polyolefin adhesive film further includes a heat sealing film layer being formed on another side surface of the support base layer by the co-extrusion.

In one of the possible or preferred embodiments, the heat sealing film layer is formed of a propylene polymer, and the propylene polymer is at least one of a propylene copolymer (co-PP) and a propylene homopolymer (homo-PP).

Therefore, in the polyolefin adhesive film provided by the present disclosure, by virtue of "a support base layer being a polypropylene film," "a bonding adhesive layer being formed on a side surface of the support base layer by co-extrusion," "the bonding adhesive layer including a polyolefin copolymer and inorganic particles dispersed in the polyolefin copolymer; in which the polyolefin copolymer is modified by maleic anhydride, and the inorganic particles are modified by epoxy siloxane," and "a graft ratio of the maleic anhydride modified on the polyolefin copolymer ranging from 1% to 5%, and a weight ratio of the epoxy siloxane modified on the inorganic particles ranging from 0.3% to 4%, in which, when the polyolefin adhesive film undergoes a heating operation, the epoxy siloxane modified on the inorganic particles and the maleic anhydride modified on the polyolefin copolymer undergo a cross-linking reaction, so that a hardness of the bonding adhesive layer is increased," the polyolefin adhesive film and a metal aluminum foil can have good adhesion there-between, so as to avoid delamination or expansion between the polyolefin adhesive film and the metal aluminum foil under a high operating temperature. Accordingly, the problem of electrolytic liquid leakage can be avoided.

Furthermore, the polyolefin adhesive film of the present disclosure is particularly suitable for use in electronic packaging materials for power batteries with higher output wattage in electric vehicles.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
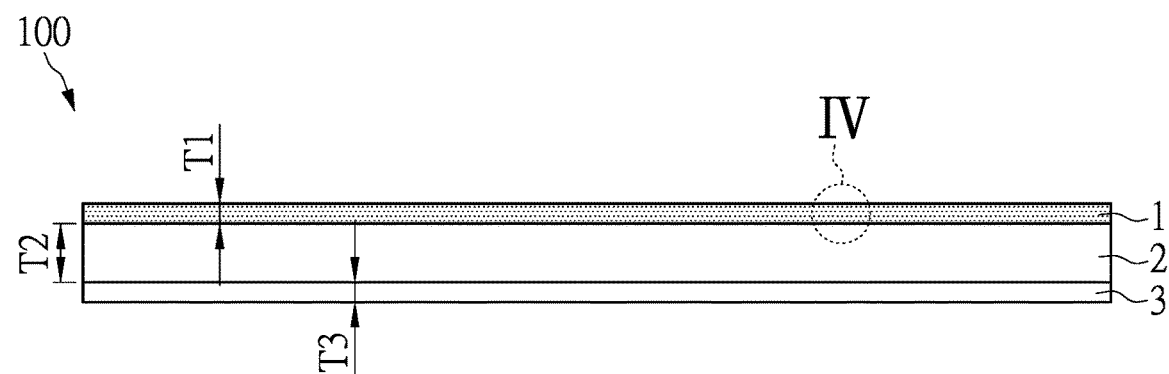
FIG. 1 is a schematic view showing a polyolefin adhesive film according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4, a first embodiment of the present disclosure provides a polyolefin adhesive film 100 that includes a bonding adhesive layer 1, a support base layer 2, and a heat sealing film layer 3. The bonding adhesive layer 1 is formed on a side surface of the support base layer 2 (i.e., an upper surface of the support base layer 2 as shown in FIG. 1). The heat sealing film layer 3 is formed on another side surface of the support base layer 2 (i.e., a lower surface of the support base layer 2, as shown in FIG. 1). That is, the support base layer 2 is located between the bonding adhesive layer 1 and the heat sealing film layer 3.

In the present embodiment, the bonding adhesive layer 1, the support base layer 2, and the heat sealing film layer 3 of the polyolefin adhesive film 100 are formed into a laminated film layer structure by co-extrusion. That is, the bonding adhesive layer 1 is formed on the support base layer 2 by co-extrusion.

Figure 2:
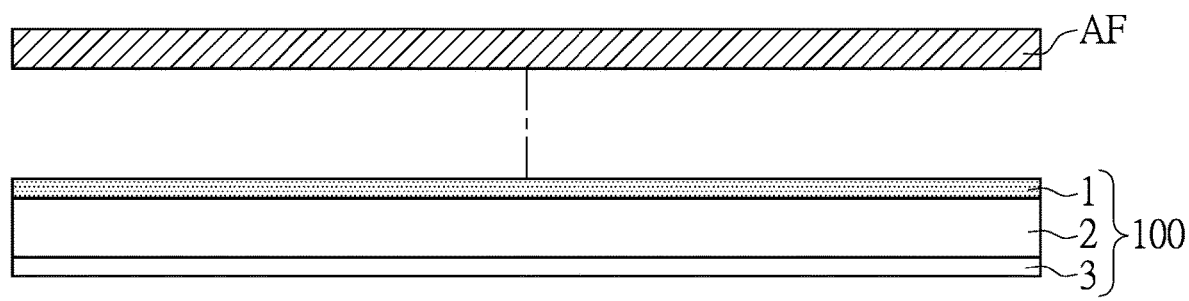
FIG. 2 is a schematic view showing the polyolefin adhesive film as shown in FIG. 1 before being bonded to an aluminum foil.
Figure 3:
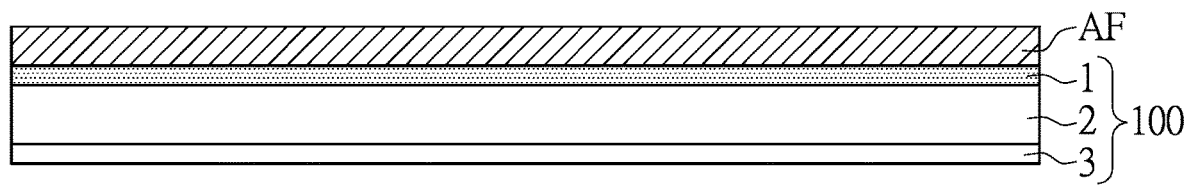
FIG. 3 is another schematic view showing the polyolefin adhesive film as shown in FIG. 1 after being bonded to the aluminum foil to form an aluminum plastic film.

The polyolefin adhesive film 100 is able to be bonded to a metal aluminum foil AF through the bonding adhesive layer 1 as shown in FIG. 2 and FIG. 3 to form an aluminum plastic film. The support base layer 2 enables the polyolefin adhesive film 100 to have impact resistance and supporting characteristics. Furthermore, the heat sealing film layer 3 enables the polyolefin adhesive film 100 to be heat-sealable.

Accordingly, the polyolefin adhesive film 100 is suitable for use in packaging materials, especially packaging materials for lithium batteries or packaging materials for electronic products, but the present disclosure is not limited thereto.

It is worth mentioning that the polyolefin adhesive film 100 of the present embodiment is particularly suitable for use in power batteries with higher output wattage for electric vehicles, and can be used as electronic packaging materials for lithium batteries.

The aluminum plastic film formed by bonding the polyolefin adhesive film 100 to the metal aluminum foil AF can have good adhesion there-between, and can avoid delamination or expansion between the polyolefin adhesive film 100 and the metal aluminum foil AF under a high operating temperature. Accordingly, the problem of electrolytic liquid leakage can be avoided.

In terms of thickness, a first thickness T1 of the bonding adhesive layer 1 is between 4 μm and 12 μm, and preferably between 6 μm and 10 μm. A second thickness T2 of the support base layer 2 is between 15 μm and 35 μm, and preferably between 20 μm and 28 μm. In addition, a third thickness T3 of the heat sealing film layer 3 is between 4 μm and 12 μm, and preferably between 6 μm and 10 μm.

From another perspective, an overall thickness of the polyolefin adhesive film 100 is between 20 micrometers and 60 micrometers, and preferably between 20 micrometers and 50 micrometers.

In addition, a thickness ratio among the first thickness T1 of the bonding adhesive layer 1, the second thickness T2 of the support base layer 2, and the third thickness T3 of the heat sealing film layer 3 is 10 to 25:50 to 80:10 to 25, but the present disclosure is not limited thereto.

Figure 4:
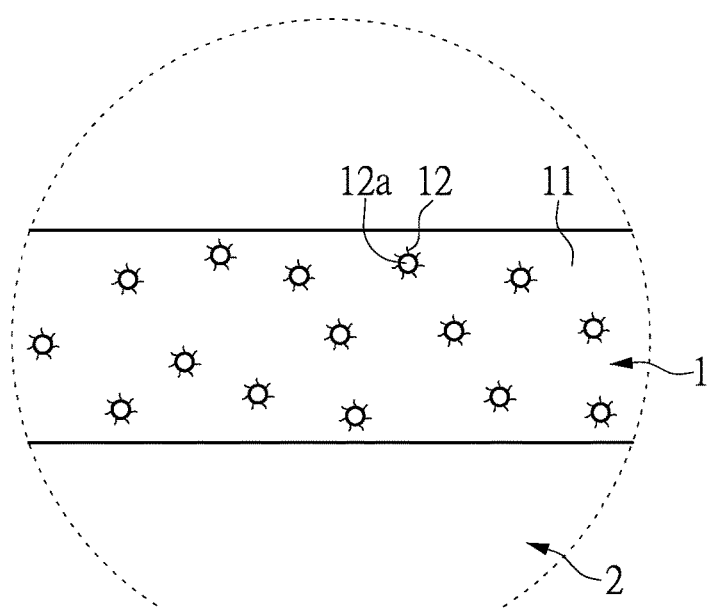
FIG. 4 is a partial enlarged view of region IV in FIG. 1.

Further, as shown in FIG. 4, the bonding adhesive layer 1 includes a polyolefin copolymer 11 and inorganic particles 12 dispersed in the polyolefin copolymer, in which the polyolefin copolymer 11 is modified by maleic anhydride (MAH), and the inorganic particles 12 are modified by epoxy siloxane.

The polyolefin copolymer 11 can, for example, be formed by copolymerization of at least two kinds of C2 to C4 olefin molecules. It should be known by those skilled in the art that the C2 olefin molecules are ethylene (PE), the C3 olefin molecules are propylene (PP), and the C4 olefin molecules are butylene, such as 1-butylene.

For example, the raw materials for forming the polyolefin copolymer 11 can be, for example, C2 olefin molecules and C3 olefin molecules, C2 olefin molecules and C4 olefin molecules, C3 olefin molecules and C4 olefin molecules, or C2 to C4 olefin molecules.

Preferably, the raw materials for forming the polyolefin copolymer 11 can be, but are not limited to, C3 olefin molecules and C4 olefin molecules. In addition, a weight ratio between the two kinds of olefin molecules (i.e., C3 olefin molecules and C4 olefin molecules, or C2 olefin molecules and C4 olefin molecules) can, for example, be from 30:70 to 70:30, and preferably from 40:60 to 60:40, but the present disclosure is not limited thereto.

It is worth mentioning that the polyolefin copolymer 11 of the present embodiment is formed by the copolymerization reaction of at least two kinds of C2 to C4 olefin molecules, such that the bonding adhesive layer 1 can have high transparency and bonding ability.

Further, in the present embodiment, the polyolefin copolymer 11 is modified by the maleic anhydride (MAH). The polyolefin copolymer 11 modified by the maleic anhydride can have carboxyl groups (—COOH), so that the polarity of the polyolefin copolymer 11 can be greatly improved. The polyolefin copolymer 11 modified by the maleic anhydride can have better water solubility and bonding ability compared to an unmodified polyolefin copolymer, so that the polyolefin copolymer 11 is more suitable for forming an adhesive layer.

The maleic anhydride can be, for example, grafted onto the polyolefin copolymer 11. More specifically, the maleic anhydride can be, for example, melt-grafted onto the polyolefin copolymer 11. The melt grafting modification can be performed in a single-screw extruder, a twin-screw extruder, or a rheometer, and is preferably performed in a twin-screw extruder.

In the bonding adhesive layer 1, a content of the polyolefin copolymer 11 is not less than 90 wt %, and preferably not less than 95 wt %.

In addition, a graft ratio of the maleic anhydride modified (grafted) onto the polyolefin copolymer 11 is between 1% and 5%, and preferably between 2% and 4%. In a specific embodiment, the graft ratio of the maleic anhydride modified onto the polyolefin copolymer 11 is 3%.

It is worth mentioning that, in the present embodiment, the graft ratio of the maleic anhydride needs to be controlled between 1% and 5% in order to provide better bonding ability. If the graft ratio of the maleic anhydride is lower than 1%, the bonding ability of the bonding adhesive layer 1 will be deteriorated. Conversely, if the graft ratio of the maleic anhydride is higher than 5%, the bonding adhesive layer 1 will be too rigid after being bonded to an aluminum foil, thereby affecting the bending resistance of a packaging material.

It should be noted that the "graft ratio" of the maleic anhydride referred to herein can be analyzed by Fourier-transform infrared spectroscopy (FTIR). Fourier-transform infrared spectroscopy can not only qualitatively analyze whether or not the maleic anhydride is grafted onto the molecular chain of the polyolefin copolymer, but also quantify the graft ratio of the maleic anhydride.

It can be seen from an infrared spectrum that a maleic anhydride grafted substance has obvious absorption peaks at 1725 $cm^{-1}$ and 1790 $cm^{-1}$, and the absorption peaks are characteristic peaks of carboxyl groups in the maleic anhydride. In addition, a quantitative analysis of the graft ratio of the maleic anhydride can be performed, for example, according to the Lambert-Beer law.

It is worth mentioning that the graft ratio of the maleic anhydride refers to a weight ratio (%) of maleic anhydride grafted per 100 parts by weight of the polyolefin copolymer.

Further, in the present embodiment, a melt flow index (MFI) of the polyolefin copolymer 11 modified by the maleic anhydride is controlled to be between 1 g/10 min and 5 g/10 min, and preferably between 2 g/10 min and 4 g/10 min.

In a specific embodiment, the melt flow index of the polyolefin copolymer 11 modified by the maleic anhydride is 3.1 g/10 min.

It is worth mentioning that, the melt flow index of the polyolefin copolymer 11 needs to be controlled between 1 g/10 min and 5 g/10 min to enable the bonding adhesive layer 1 to have better bonding ability, transparency, and appearance (i.e., no obvious streaks are observed on a flat surface of a packaging material).

If the melt flow index of the polyolefin copolymer 11 exceeds the above-mentioned range, the bonding adhesive layer 1 may have poor adhesion or streaks may be observed on the surface of the packaging material.

It should be noted that the "melt flow index (MFI)" referred to herein refers to a weight of the polyolefin copolymer passing through a standard die every 10 minutes on a melt flow velocimeter, and the unit of the melt flow index is g/10 min.

The melt flow index represents the fluidity of a resin material in a molten state. The larger the melt flow index is, the smaller the molecular weight of the resin material is, and the better the fluidity of the resin material is. Conversely, the larger the molecular weight of the resin material is, the more difficult it is for the molecular chain to move; further, the smaller the melt flow index is, the lower the fluidity of the resin material is.

In the present embodiment, the melt flow index is measured according to ASTM D1238 under the conditions of 190° C. and a load of 2.16 kg.

Furthermore, as shown in FIG. 4, the inorganic particles 12 are modified by epoxy siloxane, so that the surfaces the inorganic particles 12 can have the functional groups of epoxy siloxane 12a.

More specifically, the inorganic particles 12 are modified by soaking in an epoxy siloxane aqueous solution, so that the epoxy siloxane that is in a liquid state can be modified (grafted) onto the inorganic particles 12 that is in a solid state.

After the inorganic particles 12 modified by the functional groups of epoxy siloxane 12a are introduced into the bonding adhesive layer 1, the functional groups of epoxy siloxane 12a on the surfaces of the inorganic particles 12 (e.g., epoxy groups) can undergo a cross-linking reaction with the functional groups of maleic anhydride on the polyolefin copolymer 11 (e.g., carboxy groups). The cross-linking reaction will proceed at a faster rate and achieve a higher degree of cross-linking and curing especially during a heating operation (e.g., a heat sealing operation), but the present disclosure is not limited thereto.

Additionally, the functional groups of the epoxy siloxane 12a modified on the inorganic particles 12 (e.g., epoxy groups) can also undergo a self-crosslinking reaction, thereby enabling the bonding adhesive layer 1 to achieve an improved hardening effect.

According to the above configuration, in the aluminum plastic film, the bonding adhesive layer 1 of the polyolefin adhesive film 100 of the present embodiment can have good adhesion with the metal aluminum foil AF, thereby avoiding delamination or expansion between the polyolefin adhesive film 100 and the metal aluminum foil AF at a high operating temperature, so as to avoid the problem of electrolyte liquid leakage.

It is worth mentioning that the epoxy siloxane in the liquid state cannot be evenly dispersed in the polyolefin copolymer.

In the embodiment of the present disclosure, the surfaces of the inorganic particles 12 are modified by the functional groups of the epoxy siloxane, so that the epoxy siloxane can be uniformly dispersed in the polyolefin copolymer by using the inorganic particles 12 as carriers.

In some embodiments of the present disclosure, the inorganic particles are selected from the group consisting of: silicon dioxide particles ($SiO_2$ particles), calcium carbonate particles ($CaCO_3$ particles), barium sulfate particles ($BaSO_4$ particles), kaolin clay particles, and mica particles.

Preferably, the inorganic particles 12 are silicon dioxide particles, but the present disclosure is not limited thereto.

Further, shapes of the inorganic particles are preferably spherical. More specifically, each of the inorganic particles has a sphericity (i.e., degree of true sphericity) ranging from 0.7 to 1.0.

In the present disclosure, the "sphericity" of a particle is defined as a ratio of the smallest diameter of the particle to the largest diameter of the particle. For instance, as observed through scanning electron microscopy (SEM), a ratio of the observed smallest diameter to the largest diameter greater than 0.8 indicates that the sphericity of the particle is above 0.8.

If the "sphericity" of the particle approaches 1, the particle is nearing an ideal sphere.

Preferably, each of the inorganic particles has the sphericity ranging between 0.8 and 1.0.

In terms of particle size range, the inorganic particles have an average particle size (i.e., D50 particle size) of between 1 micrometer and 8 micrometers, and preferably between 3 micrometers and 6 micrometers.

If the average particle size of the inorganic particles is below the lower limit of the above-mentioned size range (e.g., less than 1 micrometer), the effect of the inorganic particles on enhancing the adhesion between the bonding adhesive layer 1 and the metal aluminum foil AF is not significant. If the average particle size of the inorganic particles exceeds the upper limit of the above-mentioned size range (e.g., more than 8 micrometers), the inorganic particles may affect the transparency of the polyolefin bonding adhesive layer 1.

Furthermore, a weight ratio of the epoxy siloxane modified on the inorganic particles 12 (i.e., a modification amount) ranges from 0.3% to 4%, preferably ranges from 0.4% to 3%, and more preferably ranges from 0.5% to 2%.

That is, based on 100 parts by weight of the inorganic particles, a weight of an epoxy siloxane is between 0.3 parts by weight and 4 parts by weight, preferably between 0.4 parts by weight and 3 parts by weight, and more preferably between 0.5 parts by weight and 2 parts by weight.

It is worth mentioning that in the present embodiment, the weight ratio of the epoxy siloxane modified on the inorganic particles 12 needs to be within the above range in order to significantly improve the adhesion between the bonding adhesive layer 1 and the metal aluminum foil AF.

If the weight ratio of the epoxy siloxane is higher than 4%, the modification amount of the epoxy siloxane 12a on the surfaces of the inorganic particles 12 tends to be saturated, which cannot significantly benefit the enhancement of adhesion between the bonding adhesive layer 1 and the metal aluminum foil AF, and may also affect a haze value of the bonding adhesive layer 1.

Conversely, if the weight ratio of the epoxy siloxane is less than 0.3%, the effect of the epoxy siloxane on enhancing the adhesion between the bonding adhesive layer 1 and the metal aluminum foil AF is not significant.

It is worth mentioning that in the present embodiment, the weight ratio of the epoxy siloxane modified on the inorganic particles can be quantitatively analyzed, for example, through thermo-gravimetric analysis (TGA).

The analysis method can involve burning the inorganic particles modified by the epoxy siloxane at a high temperature of 800° C., and calculating a weight loss before and after combustion, in which the weight loss represents the modification amount of the epoxy siloxane.

The temperature of 800° C. is above the boiling point of the epoxy siloxane but below the melting point of the inorganic particles (e.g., $SiO_2$ particles). Additionally, whether the epoxy siloxane has been modified on the inorganic particles can be qualitatively analyzed through a Fourier transform infrared spectrometer (FT-IR), such as by analyzing whether the gas released after combustion has characteristic absorption peaks of the epoxy functional group, but the present disclosure is not limited thereto.

In some embodiments of the present disclosure, in the bonding adhesive layer 1, an addition amount of the inorganic particles modified by the epoxy siloxane ranges from 500 ppm to 2,000 ppm, and preferably ranges from 500 ppm to 1,500 ppm. This range has a significant effect on enhancing the adhesion between the bonding adhesive layer 1 and the metal aluminum foil AF.

If the addition amount of the inorganic particles modified by the epoxy siloxane in the bonding adhesive layer 1 is below 500 ppm, the polyolefin adhesive film 100 may stick during a rolling process. Conversely, if the addition amount of the inorganic particles modified by the epoxy siloxane in the bonding adhesive layer 1 exceeds 2,000 ppm, the haze of the polyolefin adhesive film 100 may be too high.

It is worth mentioning that the preparation of the polyolefin copolymer is carried out in the presence of a peroxide (e.g., 0.3 wt % to 0.6 wt % peroxide) by processing and pelletizing through a twin-screw extruder. During the extruding process, the maleic anhydride is melt-grafted onto the polyolefin copolymer, and the inorganic particles modified by the epoxy siloxane are dispersed in the polyolefin copolymer. In addition, the melt flow index of the polyolefin copolymer can also be controlled.

Furthermore, the polyolefin copolymer formed by pelletizing (e.g., grafted with maleic anhydride and dispersed with inorganic particles modified by epoxy siloxane) can, for example, be formed into the polyolefin bonding adhesive layer 1 on the side surface of the support base layer 2 through co-extrusion.

According to the above-mentioned technical solution, the polyolefin adhesive film 100 of the embodiment of the present disclosure can be directly and thermally bonded to the metal aluminum foil AF through the bonding adhesive layer 1 thereof as shown in FIG. 2 and FIG. 3, so that no additional polyester glue or polyurethane glue is required for bonding.

The polyolefin adhesive film 100 of the embodiment of the present disclosure not only has self-bonding properties, but can also solve the problem of volatilization of volatile organic solvents (VOC) that exists in the bonding process of the related art. In addition, the polyolefin adhesive film 100 can be bonded to a metal aluminum foil AF to form an aluminum plastic film.

The polyolefin adhesive film 100 and the metal aluminum foil AF can have good adhesion there-between, so as to avoid delamination or expansion between the polyolefin adhesive film 100 and the metal aluminum foil AF under a high operating temperature. Accordingly, the problem of electrolytic liquid leakage can be avoided.

Further referring to FIG. 1, the support base layer 2 can be a cast polypropylene film (CPP film, also known as an un-stretched polypropylene film), which enables the polyolefin adhesive film 100 to have impact resistance and supporting properties required in packaging materials.

More specifically, a material composition of the support base layer 2 includes: a propylene block polymer, a vinyl elastomer, another polyolefin copolymer modified by maleic anhydride (MAH), and a slip agent.

Based on a total weight of the support base layer 2 being 100 wt %, a content of the propylene block polymer is between 50 wt % and 90 wt %, and preferably between 60 wt % and 80 wt %. In addition, a content of the vinyl elastomer is between 5 wt % and 30 wt %, and preferably between 15 wt % and 25 wt %. A content of the another polyolefin copolymer modified by the maleic anhydride is between 5 wt % and 20 wt %, and preferably between 5 wt % and 15 wt %. A content of the slip agent is between 100 ppm and 5,000 ppm, and preferably between 1,000 ppm and 4,000 ppm.

Further, the propylene block polymer includes blocks composed of ethylene propylene elastic rubber (EPR), and a weight percentage of the ethylene propylene elastic rubber in the propylene block polymer is at least 18%, and preferably between 18% and 30%, but the present disclosure is not limited thereto.

It is worth mentioning that the content of the ethylene propylene elastic rubber in the propylene block polymer needs to be within the above weight percentage of between 18% and 30%, so that the support base layer 2 can have good moldability.

Furthermore, the vinyl elastomer can be, for example, an ethylene-butylene elastomer, which is a copolymer formed of ethylene, butane, and a small amount of bridging terminal monomers that have carboxylic acid groups. A weight percentage of the ethylene in the vinyl elastomer is at least 30%, and preferably between 30% and 60%.

Accordingly, the vinyl elastomer enables the support base layer 2 to have better moldability, and can prevent the support base layer 2 from impact whitening.

In the support base layer 2, the another polyolefin copolymer modified by the maleic anhydride can be similar in material characteristics to the bonding adhesive layer 1. The another polyolefin copolymer is formed by copolymerization of at least two kinds of C2 to C4 olefin molecules. Furthermore, a graft ratio of the maleic anhydride grafted onto the another polyolefin copolymer is between 1% and 5%, and a melt flow index of the another polyolefin copolymer modified by the maleic anhydride is between 1 g/10 min and 5 g/10 min.

In the present embodiment, since the support base layer 2 includes a small amount of the another polyolefin copolymer modified by the maleic anhydride (e.g., between 5 wt % and 20 wt %), the support base layer 2 can have a higher affinity to the bonding adhesive layer 1, so that the support base layer 2 and the bonding adhesive layer 1 can have a good interlayer bonding strength.

If the content of the another polyolefin copolymer modified by the maleic anhydride in the support base layer 2 is lower than the above-mentioned content range, the interlayer bonding strength will become poor. On the contrary, if the content of the another polyolefin copolymer modified by the maleic anhydride in the support base layer 2 is higher than the above-mentioned content range, the moldability of the packaging material will be deteriorated.

Furthermore, the slip agent can be, for example but not limited to, silicon dioxide ($SiO_2$) or talc, which can improve the moldability and processability of the support base layer 2. Furthermore, in the present embodiment, the slip agent in the support base layer 2 is not modified by epoxy siloxane, but the present disclosure is not limited thereto.

Furthermore, the support base layer 2 has a visible light transmittance of between 80% and 99% and a haze value of between 5% and 30%, but the present disclosure is not limited thereto. It should be noted that the visible light transmittance and the haze value are tested according to ASTM D1003.

Further referring to FIG. 1, the material composition of the heat sealing film layer 3 is a propylene polymer.

For example, the propylene polymer can be at least one of a propylene co-polymer (co-PP) and a propylene homopolymer (homo-PP). The propylene copolymer can, for example, be formed by copolymerization of propylene and ethylene.

In the present embodiment, a weight percentage of the ethylene in the propylene copolymer is preferably not greater than 2%. Accordingly, the heat sealing film layer 3 improves the heat-sealing strength of the polyolefin adhesive film 100.

According to the above-mentioned technical solution, the polyolefin adhesive film 100 of the embodiment of the present disclosure can be directly and thermally bonded to a metal aluminum foil AF through the bonding adhesive layer 1 that is formed on the support base layer 2 by co-extrusion as shown in FIG. 2 and FIG. 3, and does not require any additional polyester or polyurethane glue for bonding. The polyolefin adhesive film 100 of the embodiment of the present disclosure not only has self-bonding properties, but also solves the problem of volatilization of volatile organic solvents (VOCs) during the bonding process in the related art.

In addition, the polyolefin adhesive film 100 of the embodiment of the present disclosure also solves the problem of insufficient bonding strength caused by the deterioration of bonding strength of dry composite polyolefin film/aluminum foil packaging materials in the related art exposed under a high temperature and high humidity environment for an extended period of time.

Furthermore, the heat sealing film layer 3 of the polyolefin adhesive film 100 of the embodiment of the present disclosure has an excellent heat sealing strength.

A heat sealing strength of the polyolefin adhesive film 100 of the embodiment of the present disclosure measured according to QB/T2358-1998 can reach 83 N/15 mm. The test conditions can be, for example, cutting a sample into a size of 15 mm*15 mm and conducting a measurement at a temperature of 180° C. and a pressure of 1 kgf/cm2 after a heat sealing time of 3 seconds. The polyolefin adhesive film 100 still has an interlayer bonding strength of greater than 14.6 N/15 mm after being soaked in an electrolyte environment at 85° C. for 168 hours.

The polyolefin adhesive film 100 can be bonded to a metal aluminum foil AF to form an aluminum plastic film. The polyolefin adhesive film 100 and the metal aluminum foil AF can have good adhesion there-between, so as to avoid delamination or expansion between the polyolefin adhesive film 100 and the metal aluminum foil AF under a high operating temperature. Accordingly, the problem of electrolytic liquid leakage can be avoided.

Furthermore, the polyolefin adhesive film 100 of the present disclosure is particularly suitable for use in electronic packaging materials for power batteries with higher output wattage in electric vehicles.

Experimental Data and Test Results

To prove the above-mentioned technical effects of the polyolefin adhesive film of the present disclosure, Exemplary Examples 1 to 4 and Comparative Examples 1 to 3 will be described below. Among them, Exemplary Examples 1 to 4 are the groups that can prove the technical effects of the present disclosure, and Comparative Examples 1 to 3 are groups with poor experimental effects. However, the following Exemplary Examples are only intended to aid in the understanding of the present disclosure, and the scope of the present disclosure is not limited to the contents of these Exemplary Examples.

Exemplary Example 1 provides a three-layer laminated polyolefin adhesive film formed by co-extrusion, which includes a bonding adhesive layer, a support base layer, and a heat sealing film layer that are stacked in sequence. The bonding adhesive layer includes a polyolefin copolymer modified by maleic anhydride. The polyolefin copolymer is formed by copolymerization of propylene (C3) and butylene (C4) in a molar ratio of 50:50. A content of the polyolefin copolymer in the bonding adhesive layer is 99.5 wt %. A graft ratio of the maleic anhydride (MA) grafted onto the polyolefin copolymer is 3%, and a melt flow index (MI) of the polyolefin copolymer is 3.1 g/10 min. The bonding adhesive layer further includes silica particles modified by epoxy siloxane, with a usage amount of 1000 ppm (parts per million). The amount of epoxy siloxane modified on the silica particles is 0.5%, and the average particle size D50 of the silica particles is 5 micrometers. Based on a total weight of the support base layer being 100 wt %, a material composition of the support base layer includes 70 wt % of a propylene block polymer, 20 wt % of a vinyl elastomer (i.e., an ethylene-butylene elastomer), 9.9 wt % of another polyolefin copolymer modified by maleic anhydride, and trace amounts of unmodified silica particles. The heat sealing film layer is composed of a propylene copolymer (co-PP), which is formed by the copolymerization of propylene and ethylene, and a weight percentage of the ethylene in the heat sealing film layer is not greater than 2%. In addition, a thickness of the bonding adhesive layer is 8 µm, a thickness of the support base layer is 24 µm, and a thickness of the heat sealing film layer is 8 µm. The polyolefin adhesive film of Exemplary Example 1 has a haze value of 7%, and an appearance of the adhesive film has no obvious streaks. A heat sealing strength of the polyolefin adhesive film measured according to QB/T2358-1998 is 87 N/15 mm. The polyolefin adhesive film is further bonded to an aluminum foil through the bonding adhesive layer, and a peeling strength that is measured between the polyolefin adhesive film and the aluminum foil is 14.7 N/15 mm. Furthermore, after immersing an aluminum-plastic film formed by the polyolefin adhesive film bonded to the aluminum foil in an electrolyte environment at 85° C. for 168 hours, the aluminum-plastic film still has a peeling strength (i.e., an interlayer bonding strength) of 13.5 N/15 mm. The polyolefin adhesive film is quite resistant to high temperature and high humidity environments. In addition, the aluminum-plastic film has a molding height of 6.5 mm, so that the aluminum-plastic laminated film is particularly suitable for use in power batteries with higher output wattage for electric vehicles, and can be used as electronic packaging materials for lithium batteries.

The preparation methods for the polyolefin adhesive films produced in Exemplary Examples 2 to 4 and Comparative Examples 1 to 3 are generally the same as in Exemplary Example 1. The differences are the amounts and parameters of the materials used, with the conditions shown in Table 1 below.

In Exemplary Example 2, the bonding adhesive layer contains 99.5 parts by weight of a polyolefin copolymer. The graft ratio of maleic anhydride (MA) modified on the polyolefin copolymer is 3%. The melt flow index (MI) of the polyolefin copolymer is 3.1 g/10 min. The amount of silica particles modified by epoxy siloxane is 1000 ppm. The modification amount of epoxy siloxane on the silica particles is 1%, and the average particle diameter D50 of the silica particles is 5 micrometers. Additionally, the support base layer includes 70 parts by weight of propylene block polymer, 20 parts by weight of ethylene-butylene elastomer, 9.9 parts by weight of maleic anhydride-modified polyolefin copolymer, and trace amounts of unmodified silica particles. The heat sealing film layer is composed of propylene copolymer (co-PP). The haze of the polyolefin adhesive film in Exemplary Example 2 is 7.2%, with no obvious streaks in appearance. The heat sealing strength of the polyolefin adhesive film, as determined according to QB/T2358-1998, is about 86 N/15 mm. The peeling strength between the polyolefin adhesive film and the aluminum foil is 17.8 N/15 mm. Further, after immersing the aluminum-plastic film formed by the polyolefin adhesive film bonded to the aluminum foil in an electrolyte environment at 85° C. for 168 hours, the aluminum-plastic film has a peeling strength of 16.6 N/15 mm. Additionally, the molding height of the aluminum-plastic laminate is 6.5 mm.

In Exemplary Example 3, the bonding adhesive layer contains 99.5 parts by weight of a polyolefin copolymer. The graft ratio of maleic anhydride (MA) modified on the polyolefin copolymer is 3%. The melt flow index (MI) of the polyolefin copolymer is 3.1 g/10 min. The amount of silica particles modified by epoxy siloxane is 1000 ppm. The modification amount of epoxy siloxane on the silica particles is 1.5%, and the average particle diameter D50 of the silica particles is 5 micrometers. The support base layer includes 70 parts by weight of propylene block polymer, 20 parts by weight of ethylene-butylene elastomer, 9.9 parts by weight of maleic anhydride-modified polyolefin copolymer, and trace amounts of unmodified silica particles. The heat sealing film layer is composed of propylene copolymer (co-PP). The haze of the polyolefin adhesive film in Exemplary Example 3 is 9.5%, with no obvious streaks in appearance. The heat sealing strength of the polyolefin adhesive film, as determined according to QB/T2358-1998, is about 85 N/15 mm. The peeling strength between the polyolefin adhesive film and the aluminum foil is 16 N/15 mm. After immersing the aluminum-plastic film formed by the polyolefin adhesive film bonded to the aluminum foil in an electrolyte environment at 85° C. for 168 hours, the aluminum-plastic film has a peeling strength of 15 N/15 mm. The molding height of the aluminum-plastic laminate is 6.5 mm.

In Exemplary Example 4, the bonding adhesive layer contains 99.5 parts by weight of a polyolefin copolymer. The graft ratio of maleic anhydride (MA) modified on the polyolefin copolymer is 3%. The melt flow index (MI) of the polyolefin copolymer is 3.1 g/10 min. The amount of silica particles modified by epoxy siloxane is 1000 ppm. The modification amount of epoxy siloxane on the silica particles is 2%, and the average particle diameter D50 of the silica particles is 5 micrometers. Additionally, the support base layer includes 70 parts by weight of propylene block polymer, 20 parts by weight of ethylene-butylene elastomer, 9.9 parts by weight of maleic anhydride-modified polyolefin copolymer, and trace amounts of unmodified silica particles. The heat sealing film layer is composed of propylene copolymer (co-PP). The haze of the polyolefin adhesive film in Exemplary Example 4 is 12%, with no obvious streaks in appearance. The heat sealing strength of the polyolefin adhesive film, as determined according to QB/T2358-1998, is about 85 N/15 mm. The peeling strength between the polyolefin adhesive film and the aluminum foil is 15.3 N/15 mm. Further, after immersing the aluminum-plastic film formed by the polyolefin adhesive film bonded to the aluminum foil in an electrolyte environment at 85° C. for 168 hours, the aluminum-plastic film has a peeling strength of 13.5 N/15 mm. Additionally, the molding height of the aluminum-plastic laminate is 6.5 mm.

In Comparative Example 1, the bonding adhesive layer contains 99.5 parts by weight of a polyolefin copolymer. The graft ratio of maleic anhydride (MA) on the polyolefin copolymer is 3%. The melt flow index (MI) of the polyolefin copolymer is 3.1 g/10 min. The silica particles in Comparative Example 1 are unmodified and used in an amount of 1000 ppm. The average particle size D50 of the silica particles is 5 micrometers. Additionally, the support base layer includes 70 parts by weight of propylene block polymer, 20 parts by weight of ethylene/butylene elastomer, 9.9 parts by weight of maleic anhydride-modified polyolefin copolymer, and trace amounts of unmodified silica particles. The heat sealing film layer is composed of propylene copolymer (co-PP). In terms of test results, the haze of the polyolefin adhesive film in Comparative Example 1 is 7%, with no obvious streaks in appearance. The heat sealing strength of the polyolefin adhesive film, as determined according to QB/T2358-1998, is about 82 N/15 mm. The peeling strength between the polyolefin adhesive film and the aluminum foil is 14.2 N/15 mm. After immersing the aluminum-plastic film formed by the polyolefin adhesive film bonded to the aluminum foil in an electrolyte environment at 85° C. for 168 hours, the aluminum-plastic film has a peeling strength of 13.2 N/15 mm. In addition, the molding height of the aluminum-plastic laminate is 6.5 mm.

In Comparative Example 2, the bonding adhesive layer contains 99.5 parts by weight of a polyolefin copolymer. The graft ratio of maleic anhydride (MA) on the polyolefin copolymer is 3%. The melt flow index (MFI) of the polyolefin copolymer is 3.1 g/10 min. The silica particles in Comparative Example 2 are unmodified and used in an amount of 2000 ppm. The average particle size D50 of the silica particles is 5 micrometers. Additionally, the support base layer includes 70 parts by weight of propylene block polymer, 20 parts by weight of ethylene/butylene elastomer, 9.9 parts by weight of maleic anhydride-modified polyolefin copolymer, and trace amounts of unmodified silica particles. The heat sealing film layer is composed of propylene copolymer (co-PP). In terms of test results, the haze of the polyolefin adhesive film in Comparative Example 2 is 15%, with no obvious streaks in appearance. The heat sealing strength of the polyolefin adhesive film, as determined according to QB/T2358-1998, is about 82 N/15 mm. The peeling strength between the polyolefin adhesive film and the aluminum foil is 11.2 N/15 mm. After immersing the aluminum-plastic film formed by the polyolefin adhesive film bonded to the aluminum foil in an electrolyte environment at 85° C. for 168 hours, the aluminum-plastic film has a peeling strength of 9.2 N/15 mm. Further, the molding height of the aluminum-plastic laminate is 5.5 mm.

In Comparative Example 3, the bonding adhesive layer contains 99.5 parts by weight of a polyolefin copolymer. The graft ratio of maleic anhydride (MA) on the polyolefin copolymer is 3%. The melt flow index (MI) of the polyolefin copolymer is 3.1 g/10 min. The silica particles in Comparative Example 3 are unmodified and used in an amount of 1000 ppm. The average particle size D50 of the silica particles is 2 micrometers. Additionally, the support base layer includes 70 parts by weight of propylene block polymer, 20 parts by weight of ethylene/butylene elastomer, 9.9 parts by weight of maleic anhydride-modified polyolefin copolymer, and trace amounts of unmodified silica particles. The heat sealing film layer is composed of propylene copolymer (co-PP). In terms of test results, the haze of the polyolefin adhesive film in Comparative Example 3 is 6.8%, with no obvious streaks in appearance. The heat sealing strength of the polyolefin adhesive film, as determined according to QB/T2358-1998, is about 82 N/15 mm. The peeling strength between the polyolefin adhesive film and the aluminum foil is 14.5 N/15 mm. After immersing the aluminum-plastic film formed by the polyolefin adhesive film bonded to the aluminum foil in an electrolyte environment at 85° C. for 168 hours, the aluminum-plastic film has a peeling strength of 13 N/15 mm. The molding height of the aluminum-plastic laminate is 6.5 mm. Further, an unrolling test for the polyolefin adhesive film in Comparative Example 3 is rated as NG (No Good).

TABLE 1

| | | Items | Exemplary Example 1 | Exemplary Example 2 | Exemplary Example 3 | Exemplary Example 4 |
|---|---|---|---|---|---|---|
| polyolefin adhesive film | bonding adhesive layer | Amount of polyolefin copolymer (parts by weight) | 99.5 | 99.5 | 99.5 | 99.5 |
| | | Graft ratio of maleic anhydride MA (%) | 3 | 3 | 3 | 3 |
| | | Melt flow index (g/10 min) | 3.1 | 3.1 | 3.1 | 3.1 |

TABLE 1-continued

|  |  | Items |  |  |  |  |
|---|---|---|---|---|---|---|
|  |  | Amount of silica particles (ppm) | 1,000 | 1,000 | 1,000 | 1,000 |
|  |  | Modification amount of epoxy siloxane (%) | 0.5 | 1 | 1.5 | 2 |
|  |  | Average particle size D50 of silica particles (micrometers) | 5 | 5 | 5 | 5 |
|  | support base layer | Amount of propylene block polymer (parts by weight) | 70 | 70 | 70 | 70 |
|  |  | Amount of ethylene-butylene elastomer (parts by weight) | 20 | 20 | 20 | 20 |
|  |  | Amount of another polyolefin copolymer modified by maleic anhydride (parts by weight) | 9.9 | 9.9 | 9.9 | 9.9 |
|  | heat sealing film layer | Amount of propylene copolymer (co-PP) (parts by weight) | 100 | 100 | 100 | 100 |
| Test Results |  | Haze value (%) | 7 | 7.2 | 9.5 | 12 |
|  |  | Appearance (with or without streaks) | No obvious streaks | No obvious streaks | No obvious streaks | No obvious streaks |
|  |  | Heat sealing strength (N/15 mm) | 87 | 86 | 85 | 85 |
|  |  | Peeling strength between polyolefin adhesive film and aluminum foil (N/15 mm) | 14.7 | 17.8 | 16.0 | 15.3 |
|  |  | Peeling strength after immersing aluminum-plastic film in 85° C. Electrolyte for 168 hrs (N/15 mm) | 13.5 | 16.6 | 15.0 | 13.5 |
|  |  | Molding height (mm) | 6.5 | 6.5 | 6.5 | 6.5 |
|  |  | Unrolling test (OK/NG) | OK | OK | OK | OK |

|  |  | Items | Comparative Example 1 | Comparative Example 2 | Comparative Example 3 |
|---|---|---|---|---|---|
| polyolefin adhesive film | bonding adhesive layer | Amount of polyolefin copolymer (parts by weight) | 99.5 | 99.5 | 99.5 |
|  |  | Graft ratio of maleic anhydride MA (%) | 3 | 3 | 3 |
|  |  | Melt flow index (g/10 min) | 3.1 | 3.1 | 3.1 |
|  |  | Amount of silica particles (ppm) | 1,000 | 2,000 | 1,000 |
|  |  | Modification amount of epoxy siloxane (%) | No modification | No modification | No modification |
|  |  | Average particle size D50 of silica particles (micrometers) | 5 | 5 | 2 |
|  | support base layer | Amount of propylene block polymer (parts by weight) | 70 | 70 | 70 |
|  |  | Amount of ethylene-butylene elastomer (parts by weight) | 20 | 20 | 20 |
|  |  | Amount of another polyolefin copolymer modified by maleic anhydride (parts by weight) | 9.9 | 9.9 | 9.9 |
|  | heat sealing film layer | Amount of propylene copolymer (co-PP) (parts by weight) | 100 | 100 | 100 |
| Test Results |  | Haze value (%) | 7 | 15 | 6.8 |
|  |  | Appearance (with or without streaks) | No obvious streaks | No obvious streaks | No obvious streaks |
|  |  | Heat sealing strength (N/15 mm) | 82 | 82 | 82 |
|  |  | Peeling strength between polyolefin adhesive film and aluminum foil (N/15 mm) | 14.2 | 11.2 | 14.5 |
|  |  | Peeling strength after immersing aluminum-plastic film in 85° C. Electrolyte for 168 hrs (N/15 mm) | 13.2 | 9.2 | 13.0 |
|  |  | Molding height (mm) | 6.5 | 5.5 | 6.5 |
|  |  | Unrolling test (OK/NG) | OK | OK | NG |

It should be noted that testing methods for the above-mentioned "haze value" and "heat sealing strength" have been described in the above-mentioned embodiments of the present disclosure, and will not be reiterated herein.

Furthermore, the "peeling strength" mentioned in the present disclosure refers to a maximum force required per unit width when bonded materials are peeled apart from a contact surface of the bonded materials (i.e., a contact surface between the polyolefin adhesive film and the aluminum foil). The testing instrument used to measure the peeling strength is a universal testing machine. An indication error of the instrument is within plus or minus 1% of an actual value. The test conditions include an ambient temperature of 23° C. plus or minus 2° C., a relative humidity of 50% plus or minus 5%, and a storage time that is greater than 4 hours. The sample preparation includes taking an appropriate amount of a sample; and respectively removing 50 mm from both ends of the sample in a widthwise direction of the sample. Five samples are cut evenly, and each of the samples has a transverse width of 15.0 mm plus or minus 0.1 mm and a length of 200 mm. The testing process is to clamp both ends of a peeled part of the sample in the upper and lower clamps of the testing instrument, so that a longitudinal axis of the peeled part of the sample coincides with a center connecting line of the upper and lower clamps, and the tightness of the clamps is adjusted to be suitable for testing. The test speed is 300 mm/min plus or minus 30 mm/min, and a peeling force curve during a peeling process of the sample is recorded. The arithmetic mean values of the longitudinal and transverse peeling strengths of each group of the samples are respectively calculated to obtain the test results, and two significant figures are taken. The unit of the peeling strength is expressed in N/15 mm.

Furthermore, the "molding height" mentioned in the present disclosure refers to the height recorded by filling the aluminum-plastic film into a 5 cm*6 cm mold of a lithium battery by cold pressing, and the unit is expressed in mm.

The evaluation process for the appearance of the packaging material is to observe the surface of the bonding adhesive layer of the packaging material with the naked eye (at a distance of about 30 cm) of a tester. If no obvious streaks can be observed, the evaluation result is recorded as having no obvious streaks. If obvious streaks can be observed, the evaluation result is recorded as having severe streaks. If the streaks cannot be observed since the haze value of the packaging material is too high, the evaluation result is recorded as unobservable.

Test Results and Discussion

As shown in the test results of Table 1, the polyolefin adhesive film prepared in each of Exemplary Examples 1 to 4 exhibits the heat sealing strength ranging from 85 to 87 N/15 mm, which is higher than 82 N/15 mm of Comparative Examples 1 to 3. The peeling strength between the polyolefin adhesive film of each of Exemplary Examples 1 to 4 and the aluminum foil ranges from 14.7 to 17.8 N/15 mm, which is higher than 11.2 to 14.5 N/15 mm of Comparative Examples 1 to 3. After immersing the aluminum-plastic film formed by the polyolefin adhesive film bonded to the aluminum foil in an electrolyte environment at 85° C. for 168 hours, the aluminum-plastic film of each of Exemplary Examples 1 to 4 exhibits a peeling strength ranging from 13.5 to 16.6 N/15 mm, which is higher than 9.2 to 13.2 N/15 mm of Comparative Examples 1 to 3.

Therefore, the polyolefin adhesive films prepared in Exemplary Examples 1 to 4 are more suitable for use in high-output power batteries for electric vehicles and can also be used as electronic packaging materials for lithium batteries.

It is worth noting that in Comparative Example 2, the amount of silica particles in the adhesive layer is 2,000 ppm, which leads to a significant increase in the haze of the polyolefin adhesive film (i.e., 15%). In Comparative Example 3, the average particle size of the silica particles in the adhesive layer is 2 micrometers, resulting in poor unrolling performance (NG) of the polyolefin adhesive film. Clearly, both the amount and particle size of silica particles have a significant impact on the properties of polyolefin adhesive films.

Second Embodiment

Figure 5:
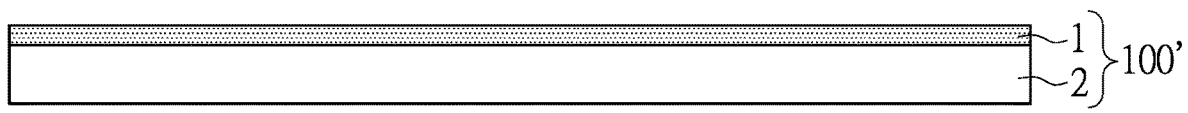
FIG. 5 is a schematic view showing a polyolefin adhesive film according to a second embodiment of the present disclosure.
Figure 6:
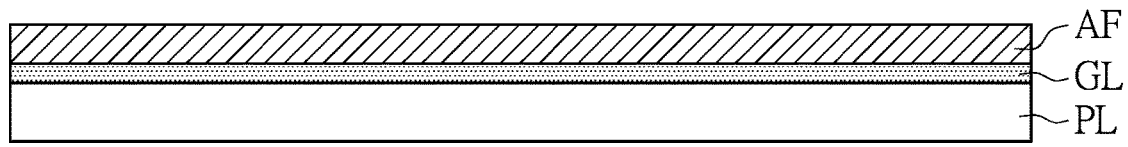
FIG. 6 is a schematic view showing a conventional aluminum-plastic film packaging material.

Referring to FIG. 5, a second embodiment of the present disclosure further provides a polyolefin adhesive film 100' that includes a bonding adhesive layer 1 and a support base layer 2. The bonding adhesive layer 1 is formed on the support base layer 2 by co-extrusion. Different from the above-mentioned first embodiment, the polyolefin adhesive film 100' of the second embodiment may not include the heat sealing film layer 3.

In the second embodiment, the material characteristics of the bonding adhesive layer 1 and the support base layer 2 are similar to those of the first embodiment, and will not be reiterated herein.

According to the above configuration, the polyolefin adhesive film 100' of the second embodiment of the present disclosure can be directly and thermally bonded to a metal aluminum foil AF through the bonding adhesive layer 1 that is formed on the support base layer 2 by co-extrusion, so that no additional polyester glue or polyurethane glue is required for bonding.

Beneficial Effects of the Embodiments

In conclusion, in the polyolefin adhesive film provided by the present disclosure, by virtue of "a support base layer being a polypropylene film," "a bonding adhesive layer being formed on a side surface of the support base layer by co-extrusion," "the bonding adhesive layer including a polyolefin copolymer and inorganic particles dispersed in the polyolefin copolymer; in which the polyolefin copolymer is modified by maleic anhydride, and the inorganic particles are modified by epoxy siloxane," and "a graft ratio of the maleic anhydride modified on the polyolefin copolymer ranging from 1% to 5%, and a weight ratio of the epoxy siloxane modified on the inorganic particles ranging from 0.3% to 4%, in which, when the polyolefin adhesive film undergoes a heating operation, the epoxy siloxane modified on the inorganic particles and the maleic anhydride modified on the polyolefin copolymer undergo a cross-linking reaction, so that a hardness of the bonding adhesive layer is increased," the polyolefin adhesive film and a metal aluminum foil can have good adhesion there-between, so as to avoid delamination or expansion between the polyolefin adhesive film and the metal aluminum foil under a high operating temperature. Accordingly, the problem of electrolytic liquid leakage can be avoided.

Furthermore, the polyolefin adhesive film of the present disclosure is particularly suitable for use in electronic packaging materials for power batteries with higher output wattage in electric vehicles.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A polyolefin adhesive film, comprising:
a support base layer being a polypropylene film; and
a bonding adhesive layer being formed on a side surface of the support base layer by co-extrusion;
wherein the bonding adhesive layer includes a maleic anhydride modified-polyolefin copolymer and epoxy siloxane modified-inorganic particles dispersed in the polyolefin copolymer;
wherein a graft ratio of the maleic anhydride modified on the polyolefin copolymer ranges from 1% to 5%, and a weight ratio of the epoxy siloxane modified on the inorganic particles ranges from 0.3% to 4%;
wherein, based on a total weight of the bonding adhesive layer being 100 wt %, a content of the maleic anhydride modified-polyolefin copolymer is pot less than 90 wt % and a content of the epoxy siloxane modified-inorganic particles ranges from 500 ppm to 2,000 ppm;
wherein, when the polyolefin adhesive film undergoes a heating operation, the epoxy siloxane modified on the inorganic particles and the maleic anhydride modified on the polyolefin copolymer undergo a cross-linking reaction, so that a hardness of the bonding adhesive layer is increased.

2. The polyolefin adhesive film according to claim 1, wherein the content of the maleic anhydride modified-polyolefin copolymer is not less than 95 wt %, and the content of the epoxy siloxane modified-inorganic particles ranges from 500 ppm to 1,500 ppm; wherein the weight ratio of the epoxy siloxane modified on the inorganic particles ranges from 0.5% to 2%.

3. The polyolefin adhesive film according to claim 2, wherein, in the bonding adhesive layer, an average particle size of the inorganic particles ranges from 1 micrometer to 8 micrometers, and a sphericity of each of the inorganic particles ranges from 0.7 to 1.0; wherein the inorganic particles are selected from the group consisting of silicon dioxide particles, calcium carbonate particles, barium sulfate particles, kaolin clay particles, and mica particles.

4. The polyolefin adhesive film according to claim 3, wherein, in the bonding adhesive layer, the average particle size of the inorganic particles ranges from 3 micrometers to 6 micrometers, and the sphericity of each of the inorganic particles ranges from 0.8 to 1.0.

5. The polyolefin adhesive film according to claim 1, wherein, in the bonding adhesive layer, the polyolefin copolymer is formed by copolymerization of at least two kinds of C2 to C4 olefin molecules, and a melt flow index of the polyolefin copolymer ranges from 3 g/10 min to 5 g/10 min.

6. The polyolefin adhesive film according to claim 5, wherein the graft ratio of the maleic anhydride modified on the polyolefin copolymer ranges from 2% to 4%, and the weight ratio of the epoxy siloxane modified on the inorganic particles ranges from 0.5% to 2%.

7. The polyolefin adhesive film according to claim 1, wherein the support base layer is a cast polypropylene film, and a material composition of the cast polypropylene film includes: a propylene block polymer, a vinyl elastomer, and another polyolefin copolymer.

8. The polyolefin adhesive film according to claim 7, wherein, in the support base layer, the propylene block polymer includes blocks composed of ethylene propylene elastic rubber, and a weight percentage of the ethylene propylene elastic rubber in the propylene block polymer is at least 18%; wherein the vinyl elastomer is an ethylene-butylene elastomer, and a weight percentage of ethylene in the vinyl elastomer is at least 30%.

9. The polyolefin adhesive film according to claim 1, further comprising:
a heat sealing film layer being formed on another side surface of the support base layer by the co-extrusion.

10. The polyolefin adhesive film according to claim 9, wherein the heat sealing film layer is formed of a propylene polymer, and the propylene polymer is at least one of a propylene copolymer (co-PP) and a propylene homopolymer (homo-PP).

* * * * *